United States Patent [19]

Aarts et al.

[11] Patent Number: 5,724,430
[45] Date of Patent: Mar. 3, 1998

[54] AUDIO-VISUAL ARRANGEMENT AND SYSTEM IN WHICH SUCH AN ARRANGEMENT IS USED

[75] Inventors: Ronaldus M. Aarts; Willem F. Druyvesteyn, both of Eindhoven, Netherlands

[73] Assignee: U.S. Philips Corporation, New York, N.Y.

[21] Appl. No.: 748,118

[22] Filed: Nov. 12, 1996

Related U.S. Application Data

[63] Continuation of Ser. No. 408,754, Mar. 22, 1995, abandoned.

[30] Foreign Application Priority Data

Mar. 24, 1994 [EP] European Pat. Off. .............. 94200763

[51] Int. Cl.$^6$ ...................................................... H04R 29/00
[52] U.S. Cl. ................................... 381/59; 381/77; 381/24
[58] Field of Search ..................................... 381/59, 24, 90, 381/77, 27, 79, 82, 71, 87, 155, 96

[56] References Cited

U.S. PATENT DOCUMENTS

| | | | |
|---|---|---|---|
| 4,311,874 | 1/1982 | Wallace, Jr. ........................ | 381/87 |
| 4,417,098 | 11/1983 | Chaplin et al. ....................... | 381/71 |
| 4,421,957 | 12/1983 | Wallace, Jr. ........................ | 381/155 |
| 4,472,834 | 9/1984 | Yamamuro et al. .................. | 381/24 |
| 4,683,590 | 7/1987 | Miyoshi et al. ...................... | 381/71 |
| 4,998,283 | 3/1991 | Nishida et al. ...................... | 381/90 |
| 5,131,050 | 7/1992 | Naslund ............................... | 381/82 |
| 5,381,485 | 1/1995 | Elliott ................................... | 381/71 |
| 5,416,846 | 5/1995 | Tamura et al. ....................... | 381/71 |
| 5,438,624 | 8/1995 | Lewiner et al. ...................... | 381/71 |

OTHER PUBLICATIONS

"Compact Disc–Interactive A Designer's Overview", pp. 108–143, Apr. 24, 1991.

Tremaine, Howard M. "Audio Cyclopedia", Howard W. Sams & Co., Inc., pp. 1153–1156 Jan. 1979.

*Primary Examiner*—Curtis Kuntz
*Assistant Examiner*—Vivian Chang
*Attorney, Agent, or Firm*—Debra K. Stephens

[57] ABSTRACT

An audio-visual arrangement, more particularly, a multimedia terminal, includes a picture screen on which pictures can be displayed. The arrangement further includes a plurality of electro-acoustic converters for reproducing sound that corresponds to audio information generated by the audio signal source. The converters are positioned at regular mutual distances along one side of the picture screen. The ratio of the strength of the control signals applied to the converters has values for which a sound wave concentration is obtained in a listening/viewing area situated dead opposite to the picture screen. With the audio-visual arrangement the nuisance of noise experienced in a living space and/or working space by persons other than the user of the arrangement remains limited. A further reduction of the nuisance can be obtained by a system in which the audio-visual arrangement is combined with means for active noise abatement.

19 Claims, 3 Drawing Sheets

AUDIO-VISUAL ARRANGEMENT AND SYSTEM IN WHICH SUCH AN ARRANGEMENT IS USED

This is a continuation of application Ser. No. 08/408,754, filed Mar. 22, 1995, now abandoned.

BACKGROUND OF THE INVENTION

The invention relates to an audio-visual arrangement comprising a picture screen, means for causing a picture to be displayed on the picture screen, electro-acoustic means for generating sound waves in response to control signals, and an audio signal source for applying control signals to the electro-acoustic means.

Such audio-visual arrangements comprise the so-called multi-media systems. A known multi-media system is the CD-i system described, for example, in the title "COMPACT DISC-INTERACTIVE; A DESIGNER'S OVERVIEW" (ISBN-90 201 2121 9).

Such systems are often used in an environment in which not only the user of the multi-media system, but also other persons are present. In this context one may think of the members of a family who are present in the same living room as the user of the multi-media system, or colleagues who are present in the same office space as the user of the multi-media system. These other persons are generally not interested in the sound produced by the multi-media system and will often be annoyed by this sound.

SUMMARY OF THE INVENTION

It is an object of the invention to provide an audio-visual arrangement of which the use is experienced as less annoying by others in the user's environment.

According to the invention this object is achieved in that the electro-acoustic means comprise a plurality of electro-acoustic converters installed on one side of the picture screen, and the means for generating control signals are arranged for driving the electro-acoustic converters by control signals whose mutual signal strength ratios have values at which sound waves are concentrated in a listening and viewing area that is substantially dead opposite to the picture screen.

As a result of the concentration of sound waves in the listening and viewing area, the volume of sound necessary for the audio-visual arrangement to produce proper understandability can remain limited and so can the annoyance to persons other than the user.

For an embodiment for the audio-visual arrangement in a predetermined user orientation of the arrangement, the pictures are displayed in upright position on the screen. With the predetermined user orientation, at least a plurality of converters are uniformly interspaced along the top and/or bottom of the picture screen.

In this embodiment, a concentration in the horizontal plane is obtained, so that persons positioned substantially beside the listening and viewing area perceive only little of the sound produced.

A further embodiment for the audio-visual arrangement has for the predetermined user orientation, at least a number of converters positioned uniformly interspaced along a left and/or right-hand side of the picture screen.

In this embodiment a concentration in the vertical plane is obtained. As a result, the negative influence of ceiling and floor reflections on the spatial sound image is reduced.

A further embodiment for the audio-visual arrangement includes the positions of converters along two mutually opposite sides of the picture screen being mutually shifted over a distance substantially equal to half the distance between two consecutive converters positioned on the same side of the picture screen.

As a result of the mutual shift of the converters positioned on either side of the picture screen, the distance between the converters, seen in the plane of concentration, becomes smaller. As a result, an improved concentration of high frequency sound waves is possible. For that matter, it is desirable that these distances be small, so that a proper concentration of these sound waves is obtained.

An annoyance caused by the produced sound and experienced by the persons other than the user may be further reduced by the extension by an additional electro-acoustic converter and a signal processor which is coupled to the audio-visual means for receiving an audio input signal that corresponds to the sound reproduced by the audio-visual arrangement. The signal processor is further coupled to the acousto-electric converter for receiving a measuring signal that corresponds to sound received by the acousto-electric converter, and is coupled to the additional converter for supplying a compensation signal to the additional electro-acoustic converter. The signal processor comprises signal processing means for deriving the compensation signal in response to the audio signal and the measuring signal so as to reduce the presence of signal components of a first audio signal in the measuring signal.

As a result of the concentration, this embodiment reduces the perceivable sound volume outside the listening and viewing area for medium and high frequencies. For low frequencies this concentration is less effective. In this embodiment the perceptibility of the low frequencies is largely combatted by active noise abatement.

BRIEF DESCRIPTION OF THE DRAWINGS

The invention will be further explained with reference to the FIGS. 1 to 8, in which.

DESCRIPTION OF THE PREFERRED EMBODIMENTS

Figure 1:
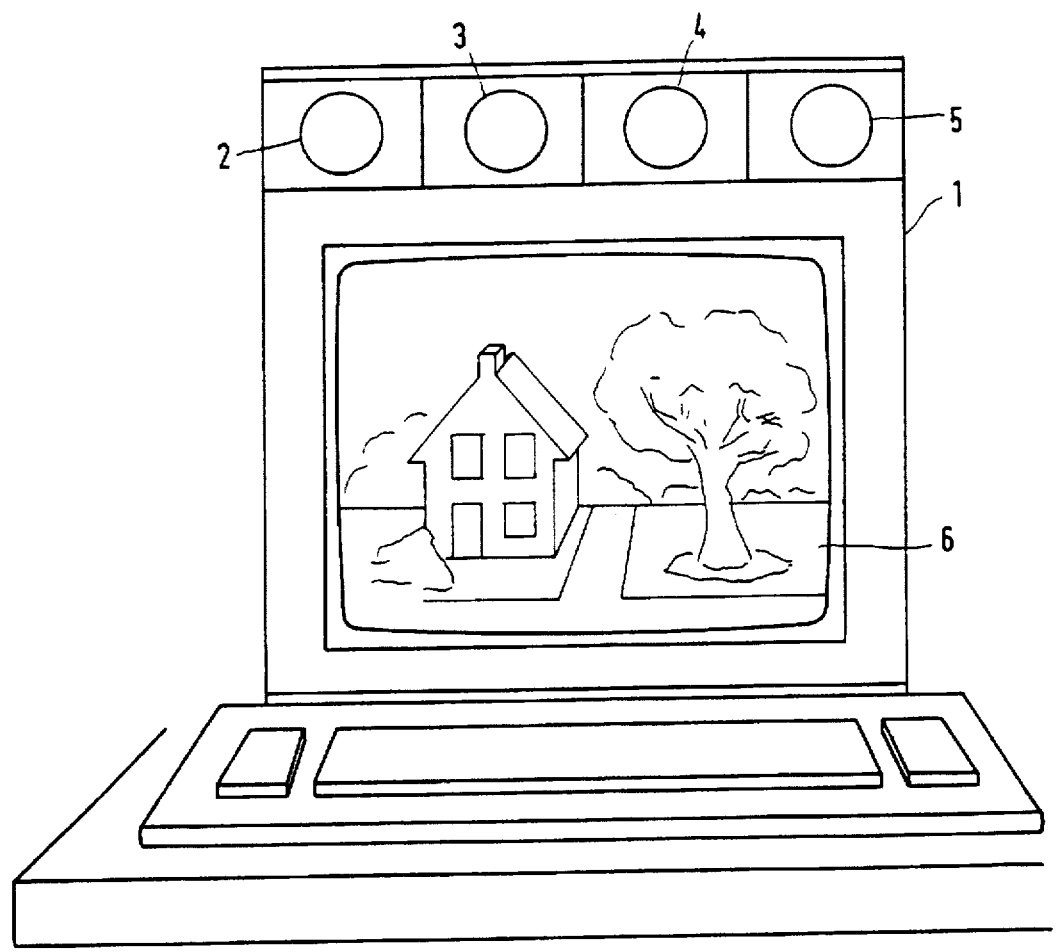
FIGS. 1, 7 and 8 show possible locations of electro-acoustic converters relative to a picture screen, for various embodiments of an audio-visual arrangement according to the invention.

FIG. 1 shows an embodiment for an audio-visual arrangement 1 according to the invention, for example, in the form of a multi;media personal computer. The arrangement 1 comprises a picture screen 6 on which a picture can be visualized by playback means (not shown) of a customary type. Furthermore, the arrangement comprises a plurality of electro-acoustic converters 2, 3, 4 and 5 of a customary type. The converters 2, 3, 4 and 5 are positioned on one side of the picture screen. The converters are controlled by control signals, while ratios between control signal strengths have values at which a concentration of soundwaves is obtained in a listening and viewing area that is situated substantially dead opposite to the picture screen 6.

Figure 2:
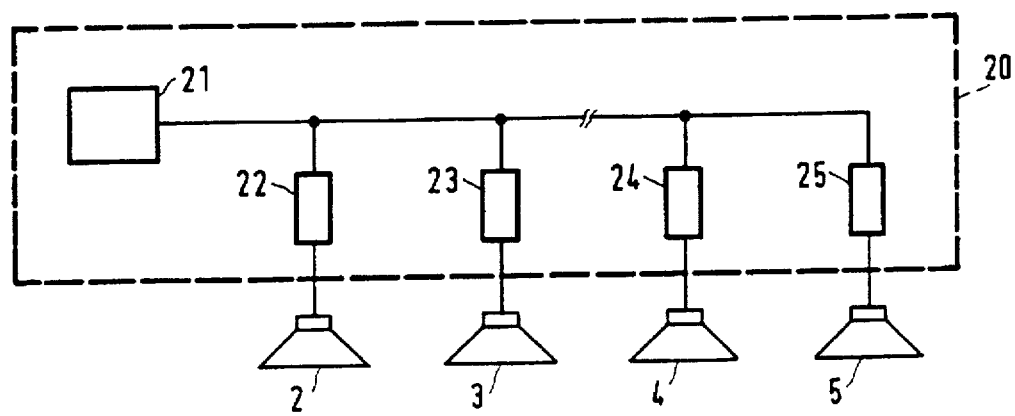
FIGS. 2 and 5 show different options for driving the electro-acoustic converters.

FIG. 2 shows an embodiment for a control circuit 20 for generating control signals for the converters 2, 3, 4 and 5. The control circuit comprises an audio signal source 21 of a customary type, which generates an audio signal that represents audio information to be reproduced. The audio signal generated by the audio signal source is supplied to the electro-acoustic converters 2, 3, 4 and 5 through filters 22, 23, 24 and 25.

Concentration characteristics are frequency-dependent, which means that for an optimum concentration mutual ratios between the control signal strengths are different for different frequencies. For utilizing the filters having a frequency-dependent response curve, mutual strength differences can be optimized for each frequency.

However, it is not necessary to utilize filters to obtain frequency-dependent ratios between the control signal strengths. A proper concentration of soundwaves in the viewing and listening area can also be obtained by frequency-independent ratios of these control signal strengths.

Figure 3:
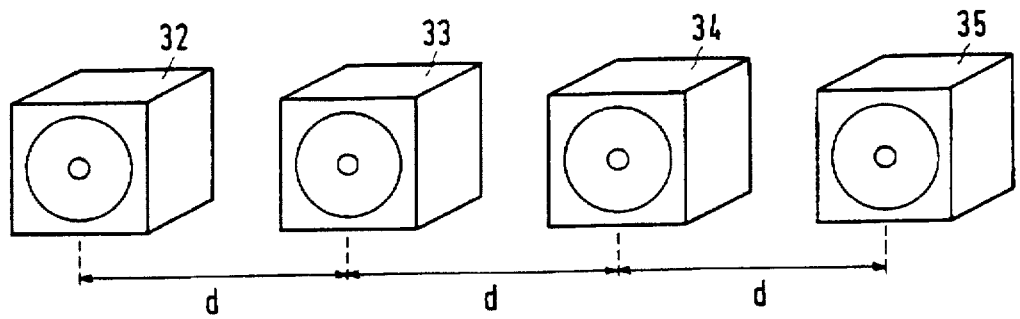
FIG. 3 shows a possible arrangement of the electro-acoustic converters for achieving a sound concentration.
Figure 5:
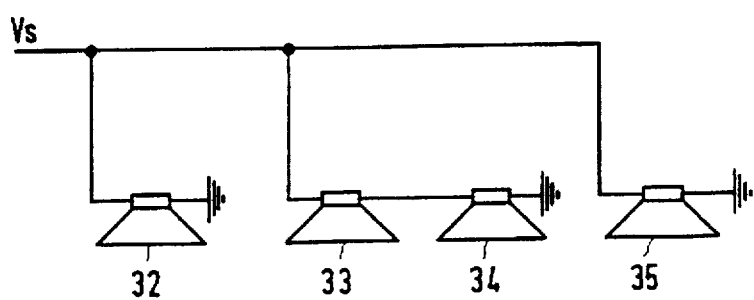

By way of illustration, FIG. 3 shows a line of four identical converters 32, 33, 34 and 35 having constant relative distances equal to d, where d is equal to 0.266 m, in this example. The control signal strength for the outside two converters 32 and 35 is, for all frequencies, twice as large as the control signal strength for the inside two converters 33 and 34. A manner in which this control signal strength ratio may be obtained is shown in FIG. 5. In the embodiment shown in FIG. 5, the same control voltage Vs is applied to the converters 32 and 35 as to a series combination of converters 33 and 34. The impedance of the series combination of the converters 33 and 34 is equal to twice the impedance of the converter 32 or 35, and as a result, the control signal strength for the converters 33 and 34 is half the strength of the control signal for the converters 32 and 35.

Figure 4:
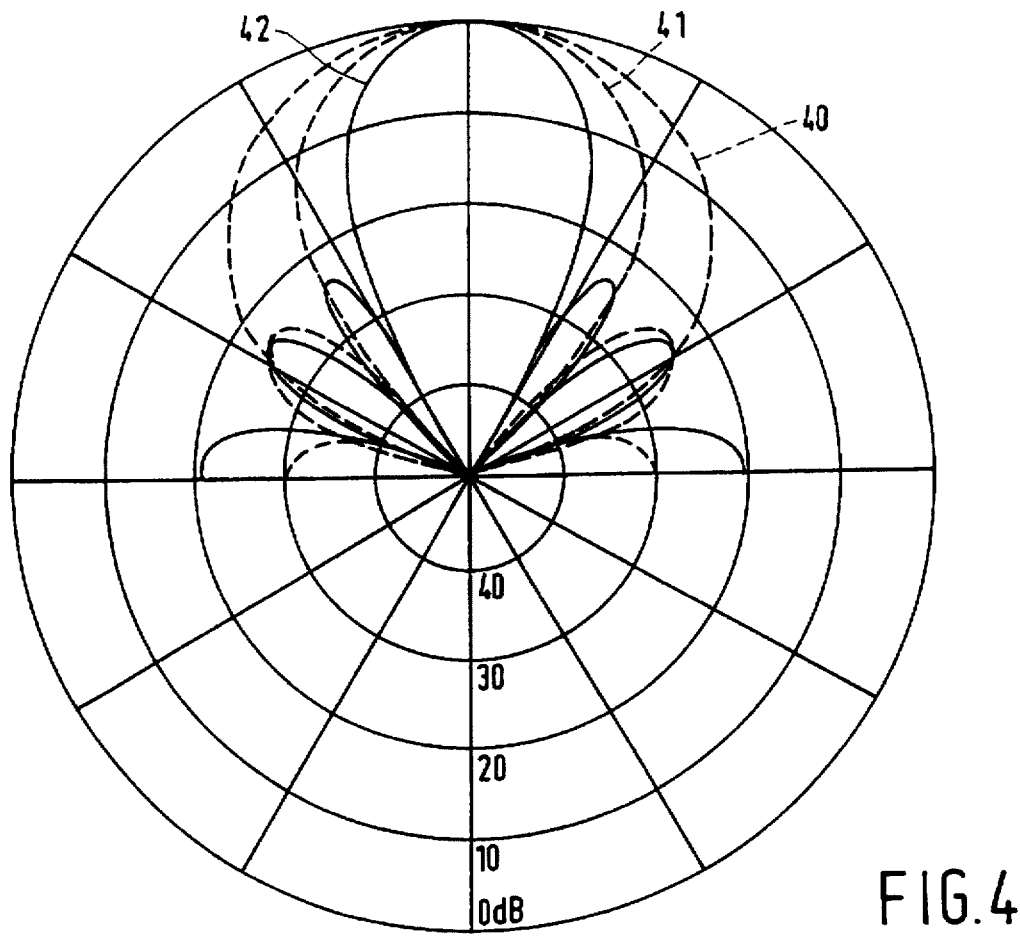
FIG. 4 shows a radiation pattern belonging to the arrangement shown in FIG. 3.

FIG. 4 shows a radiation pattern belonging to the configuration shown in FIG. 3 and FIG. 5.

In this diagram curves 40, 41 and 42 show radiation characteristics for the frequencies 866 Hz, 1225 Hz and 1732 Hz, respectively. As appears from FIG. 4, the sound is concentrated in an area dead opposite to the line of converters 32, 33, 34 and 35.

The concentration of soundwaves diminishes for lower frequencies. For these lower frequencies it is possible to realise a better concentration by increasing the overall length of the line of converters. However, in the case where the converters are accommodated in the same housing as the picture screen, which is customary in audio-visual arrangements, the room available for the line of converters is limited to a length that is of a same order of magnitude as the width of the picture screen 6.

Figure 6:
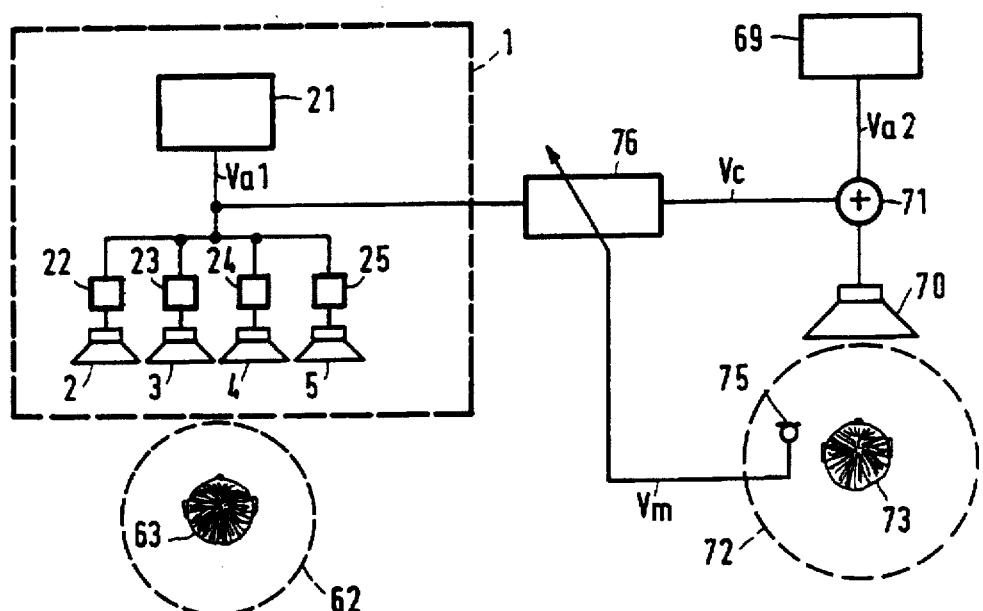
FIG. 6 shows a system in which an audio-visual arrangement according to the invention is used.

The remaining noise nuisance resulting from the insufficient degree of concentration or reflections in the room can be combatted with active noise abatement. FIG. 6 shows an embodiment for a system comprising the audio-visual arrangement 1. The audio signal source 21 present in the arrangement 1 generates an audio signal Va1 which is representative of the audio information Va1 intended for a user 63 in a listening and viewing area 62. This signal Va1 is applied with different strengths to a line of converters 2, 3, 4 and 5, so that a concentration of the sound in the listening/viewing area 62 is obtained.

In another area 72 in the (living and/or working) space in which the arrangement is installed, there is another person 73 who wishes to listen undisturbedly to different audio information Va2 coming from another audio signal source 69.

The audio signal source 69 generates an audio signal Va2 which is applied, via an adder circuit 71, to an electro-acoustic converter 70 for making the audio information Va2 audible. In the area 72 is installed an acousto-electric converter 75, for example, in the form of a microphone of a customary type, which produces a measuring signal Vm that corresponds to the sound received by the converter 75.

The measuring signal Vm produced by the acousto-electric converter 75 is applied to a signal processor 76. Also the audio signal Va1 is applied to the signal processor 76. The signal processor 76 applies a compensation signal Vc to the adder circuit 71, which adds this compensation signal to the audio signal Va2 received from the audio signal source 69. The signal processor 76 is of a type deriving the compensation signal Vc from the signal Va1 according to a customary criterion, so that the component of the signal Va1 in the measuring signal Vm is reduced as a result of the strength of the compensation signal Vc. In other words differently, the sound in the area 72 coming from the converters 2, . . . , 5 is compensated for by applying signal components of the audio signal Va1 to the converter 76.

In the system shown in FIG. 6 the perceptible sound volume in the area 72 is reduced by a concentration of the audio-signal-Va1-equivalent sound in the listening and viewing area 62. By applying active noise abatement by means of the signal processor 76, the sound volume in the area 72 caused by the converters 2, . . . 5 is reduced even more.

Since the concentration of low frequency components in the sound produced by the converters 2, . . . 5 is less effective, it is preferable during noise abatement to emphasize the compensation for the low frequency noise. This may be realised by using, in essence, low frequency components of the signal Va1 for the active noise abatement.

In the embodiment shown in FIG. 6, a compensation for the sound coming from the converters 2 . . . , 5 is realised in the area 72. It will be obvious to a person skilled in the art that it is similarly possible to realise in the area 62 a compensation for the sound produced by the converter 70. It is also possible to utilize a line of converters in lieu of a single converter 70, by which line a concentration of the sound in the area 72 is realised.

It will likewise be obvious to a person skilled in the art that the invention is applicable to situations in which no audio information need be produced in the area 72. In that case the compensation signal Vc can be fed directly to the converter 70.

Hereinbefore, embodiments have been described in which the converters are installed in line above the picture screen. Obviously, the line of converters may also be installed underneath the picture screen. In either case, a concentration of the sound in the horizontal plane is obtained.

Albeit good results are obtained with a concentration of the sound in the horizontal plane, it is advantageous to concentrate the sound not only in the horizontal plane, but also in the vertical plane. In that case the sound volume that needs to be produced by the converters for a proper perceptibility is even further reduced. In addition, when the sound is concentrated in the vertical plane, the sound volume scattered in the room as a result of floor and ceiling reflections is reduced.

Figure 7:
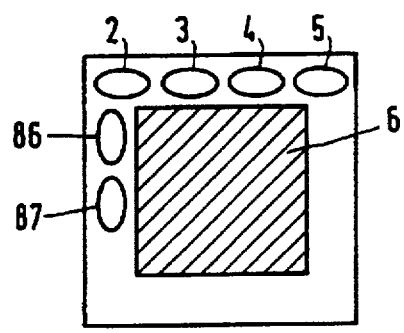

A first embodiment for an audio-visual arrangement in which the sound is concentrated in both the horizontal and the vertical plane is shown in FIG. 7. In this embodiment a line of two electro-acoustic converters 86 and 87 installed above one another are installed on one side of the picture screen, the left-hand side in FIG. 7, to concentrate the sound in the vertical plane.

The mutual relations between the strength of the control signals for the converters 2, 3, 4, 5, 86 and 87 are again selected in customary fashion in such a way that a concentration in both the horizontal and the vertical plane is obtained.

Figure 8:
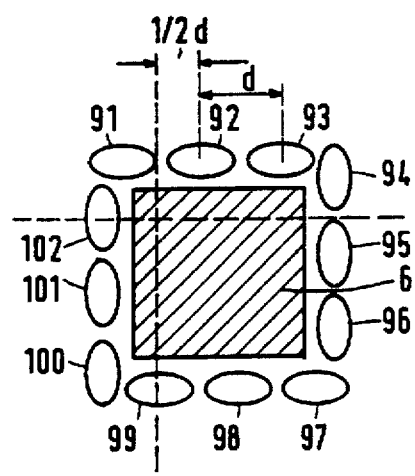

FIG. 8 shows a different array of converters by which also a concentration in the horizontal and vertical planes is obtained. In this embodiment the converters are installed around the screen 6.

In addition, the converters are positioned in two lines along opposite sides of the picture screen, mutually shifted in the direction of the line over a distance ½ d which is equal to half the distance d between centres of consecutive converters in the line.

This shift reduces the distance between the converters of two oppositely arranged lines, seen in the direction of each line. A smaller distance between the converters is advantageous in that a better concentration is obtained for high frequencies. Furthermore, it is advantageous for the concentration of sound waves to select the spaces between the converters smaller as the frequency of the soundwaves to be concentrated becomes higher.

In the audio-visual arrangement according to the invention the picture screen 6 operates as a sound board. The picture screen is then also one of the important factors determining the sound image in the space in which the audio-visual arrangement is installed. The position of the picture screen relative to the converters is fixed. Due to the fact that the picture screen has an important, space-independent, effect on the sound image, the influence of the space-dependent factors on the sound image has relatively diminished.

All this leads to the positive effect that an optimum concentration tuned to a specific space generally also provides good results in other spaces having different acoustics, which implies that a universal setting of the differences between the converter control signal strengths will suffice.

We claim:

1. An audio-visual arrangement comprising:

a picture screen;

means for causing a picture to be displayed on the picture screen;

means for generating control signals;

electro-acoustic means for generating soundwaves in response to the control signals; and an audio signal source for applying the control signals to the electro-acoustic means, the electro-acoustic means comprising:

a plurality of electro-acoustic converters installed on one side of the picture screen for concentrating soundwaves in a listening and viewing area substantially dead opposite to the picture screen, wherein said means for generating control signals is arranged for driving the electro-acoustic converters; and said control signals have proportionally decreasing signal strengths for electro-acoustic converters which are further from the center of the plurality of electro-acoustic converters.

2. An audio-visual arrangement as claimed in claim 1, wherein:

a predetermined user orientation of the audio-visual arrangement of the pictures are displayed in upright position on the screen; and with the predetermined user orientation, at least a plurality of the electro-acoustic converters are uniformly interspaced along the top and/or bottom of the picture screen.

3. An audio-visual arrangement as claimed in claim 2, wherein for the predetermined user orientation at least a number of electro-acoustic converters are positioned uniformly interspaced along a left and/or right-hand side of the picture screen.

4. An audio-visual arrangement as claimed in claim 3, wherein the number of electric-acoustic converters positioned along at least one of the sides is equal to 4.

5. An audio-visual arrangement as claimed in claim 3 wherein the positions of the electro-acoustic converters along two mutually opposite sides of the picture screen are mutually shifted over a distance substantially equal to half the distance between two consecutive electro-acoustic converters positioned on the same side of the picture screen.

6. An audio-visual arrangement as claimed in claim 2 wherein the positions of the electro-acoustic converters along two mutually opposite sides of the picture screen are mutually shifted over a distance substantially equal to half the distance between two consecutive electro-acoustic converters positioned on the same side of the picture screen.

7. An audio-visual arrangement as claimed in claim 6, wherein the number of electric-acoustic converters positioned along at least one of the sides is equal to 4.

8. An audio-visual arrangement as claimed in claim 2, wherein the number of electro-acoustic converters positioned along at least one of the sides is equal to 4.

9. An audio-visual arrangement as claimed in claim 1 wherein the number of electro-acoustic converters positioned along at least one of the sides is equal to 4.

10. An audio-visual arrangement as claimed in claim 9, wherein the ratio between the control signal strength for the outside two converters and the control signal strength for the inside two converters is equal to 2.

11. A system comprising an audio-visual arrangement as recited in claim 1, further comprising:

at least one additional electro-acoustic converter; and a signal processor which is coupled to the audio-visual means for receiving an audio input signal that corresponds to the sound reproduced by the audio-visual arrangement, said signal processor being further coupled to an acousto-electric converter for receiving a measuring signal that corresponds to sound received by the acousto-electric converter, said signal processor being coupled to the at least one additional electro-acoustic converter for supplying a compensation signal to the additional electro-acoustic converter, said signal processor comprising signal processing means for deriving the compensation signal in response to the audio input signal and the measuring signal so as to reduce presence of signal components of a first audio signal in the measuring signal.

12. A system as claimed in claim 11, wherein the signal processing means are arranged for reducing the presence of signal components that have frequencies situated in a low frequency range of the audio frequency spectrum.

13. A system as claimed in claim 12, wherein the system comprises a further audio signal source for applying an additional control signal to the additional electro-acoustic converter for sound reproduction of the sound that corresponds to the additional audio signal.

14. A system as claimed in claim 11, wherein the system comprises a further audio signal source for applying an additional control signal to the at least one additional electro-acoustic converter for sound reproduction of the sound that corresponds to the additional audio signal.

15. A system as claimed in claim 11, wherein:
   a predetermined user orientation of the audio-visual arrangement of pictures are displayed in upright position on the screen;
   with the predetermined user orientation, at least a plurality of the electro-acoustic converters are uniformly interspaced along the top and/or bottom of the picture screen.

16. A system as claimed in claim 15, wherein for the predetermined user orientation at least a number of electro-acoustic converters are positioned uniformly interspaced along a left and/or right-hand side of the picture screen.

17. A system as claimed in claim 15, wherein the positions of the electro-acoustic converters along two mutually opposite sides of the picture screen are mutually shifted over a distance substantially equal to half the distance between two consecutive electro-acoustic converters positioned on the same side of the picture screen.

18. A system as claimed in claim 11, wherein the number of converters positioned along at least one of the sides is equal to 4.

19. A system as claimed in claim 18, wherein a ratio between the control signal strength for the outside two converters and the control signal strength for the inside two converters is equal to 2.

* * * * *